(12) United States Patent
Tao et al.

(10) Patent No.: US 12,033,370 B2
(45) Date of Patent: Jul. 9, 2024

(54) LEARNING DEVICE, LEARNING METHOD, AND COMPUTER PROGRAM PRODUCT

(71) Applicant: KABUSHIKI KAISHA TOSHIBA, Minato-ku (JP)

(72) Inventors: Yaling Tao, Kawasaki (JP); Kentaro Takagi, Yokohama (JP); Kouta Nakata, Shinagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 228 days.

(21) Appl. No.: 17/000,535

(22) Filed: Aug. 24, 2020

(65) Prior Publication Data
US 2021/0248426 A1    Aug. 12, 2021

(30) Foreign Application Priority Data

Feb. 12, 2020 (JP) .................................. 2020-021893

(51) Int. Cl.
*G06V 10/764*    (2022.01)
*G06F 18/21*    (2023.01)
(Continued)

(52) U.S. Cl.
CPC ........ *G06V 10/763* (2022.01); *G06F 18/2193* (2023.01); *G06F 18/2321* (2023.01);
(Continued)

(58) Field of Classification Search
CPC ........ G06N 3/0454; G06N 20/00; G06N 3/08; G06N 7/005; G06N 3/0472; G06N 3/084; G06N 3/045; G06N 3/094; G06N 3/0464; G06N 3/0475; G06N 3/126; G06T 2207/20084; G06T 2207/20081;
(Continued)

(56) References Cited

U.S. PATENT DOCUMENTS

2019/0355103 A1* 11/2019 Baek ...................... G06N 3/088

OTHER PUBLICATIONS

Zhang et al, Defense-PointNet: Protecting PointNet Against Adversarial Attacks, Dec. 9-12, 2019 [retrieved Sep. 4, 2022], 2019 IEEE International Conference on Big Data, pp. 5654-5660. Retrieved: https://ieeexplore.ieee.org/abstract/document/9006307 (Year: 2019).*

(Continued)

*Primary Examiner* — Matthew C Bella
*Assistant Examiner* — Dennis Rosario
(74) *Attorney, Agent, or Firm* — Oblon, McClelland, Maier & Neustadt, L.L.P.

(57) ABSTRACT

According to an embodiment, a learning device includes one or more processors. The processors calculate a latent vector of each of a plurality of first target data, by using a parameter of a learning model configured to output a latent vector indicating a feature of a target data. The processors calculate, for each first target data, first probabilities that the first target data belongs to virtual classes on an assumption that the plurality of first target data belong to the virtual classes different from each other. The processors update the parameter such that a first loss of the first probabilities, and a second loss that is lower as, for each of element classes to which a plurality of elements included in each of the plurality of first target data belong, a relation with another element class is lower, become lower.

11 Claims, 12 Drawing Sheets

(51) Int. Cl.
| | |
|---|---|
| *G06F 18/2321* | (2023.01) |
| *G06F 18/2415* | (2023.01) |
| *G06F 18/2431* | (2023.01) |
| *G06N 3/08* | (2023.01) |
| *G06N 20/00* | (2019.01) |
| *G06V 10/70* | (2022.01) |
| *G06V 10/762* | (2022.01) |

(52) U.S. Cl.
CPC .... *G06F 18/24155* (2023.01); *G06F 18/2431* (2023.01); *G06N 3/08* (2013.01); *G06N 20/00* (2019.01); *G06V 10/70* (2022.01); *G06V 10/764* (2022.01)

(58) Field of Classification Search
CPC ........ G06T 5/60; G06V 10/82; G06V 10/454; G06V 20/41; G06V 10/762; G06V 10/70; G06V 10/764; G06V 30/19173; G06V 40/172; G06V 20/35; G06V 20/698; G06V 10/809; G06V 10/811; G06V 20/70; G06V 30/194; G06V 30/36; G06F 16/285; G06F 16/906; G06F 17/16; G06F 16/2237; G06F 17/18; G06F 16/35; G06F 17/15; G06F 18/23; G06F 18/23213; G06F 18/24; G06F 18/241; G06F 18/24155; G06F 18/217; G06F 16/55; G06F 30/27; G06F 18/254; G06F 16/65; G06F 16/355; G06F 16/353; G06F 2218/12; G06K 9/6218; G06K 9/6267; G16C 20/70

See application file for complete search history.

(56) References Cited

OTHER PUBLICATIONS

Qi et al., PointNet: Deep Learning on Point Sets for 3D Classification and Segmentation, Jul. 21-26, 2017, retrieved Sep. 4, 2022], 2017 IEEE Conference on Computer Vision and Pattern Recognition, pp. 77-85. Retrieved: https://ieeexplore.ieee.org/abstract/document/8099499 (Year: 2017).*

Papernot et al., Distillation as a Defense to Adversarial Perturbations against Deep Neural Networks, May 22-26, 2016 [retrieved Sep. 4, 2022], 2016 IEEE Symposium on Security and Privacy, pp. 582-597. Retrieved: https://ieeexplore.ieee.org/abstract/document/7546524 (Year: 2016).*

Googfellow et al., Deep Learning [online], retrieved Mar. 15, 2023, 801 pages. Retrieved: https://scholar.google.com/scholar?start=0&hl=en&as_sdt=0,47&cluster=16766804411681372720 (in the listed link of academia.edu) (Year: 2023).*

Goodfellow et al., Deep Learning [online: WayBack Machine captured Webpages:https://www.deeplearningbook.org/], captured 28,Dec. 31, 2015 [retrieved Mar. 15, 2023], 3 Webpages. Retrieved: https://web.archive.org/web/20150601000000*/https://www.deeplearningbook.org/ (Year: 2015).*

Ganin et al., Domain-Adversarial Training of Neural Networks, May 26, 2016 [retrieved Jul. 14, 2023], Cornell University: arXiv, [v4], 35 pages. Retrieved: https://arxiv.org/abs/1505.07818 (Year: 2016).*

Wu, Z. et al., "Unsupervised Feature Learning via Non-Parametric Instance Discrimination," Proceedings of the IEEE Conference on Computer Vision and Pattern Recognition, arXiv:1805.01978v1 [cs.CV], May 5, 2018, 10 pages.

He, K. et al., "Deep Residual Learning for Image Recognition," Proceedings of the IEEE Conference on Computer Vision and Pattern Recognition, 2016, 9 pages.

* cited by examiner

|  | (XA1)<br>C1 | (XA2)<br>C2 | (XA3)<br>C3 | (XA4)<br>C4 |
|---|---|---|---|---|
| XA1 | 0.6 | 0.1 | 0.2 | 0.1 |
| XA2 | 0.1 | 0.7 | 0.1 | 0.1 |
| ⋮ |  |  |  |  |

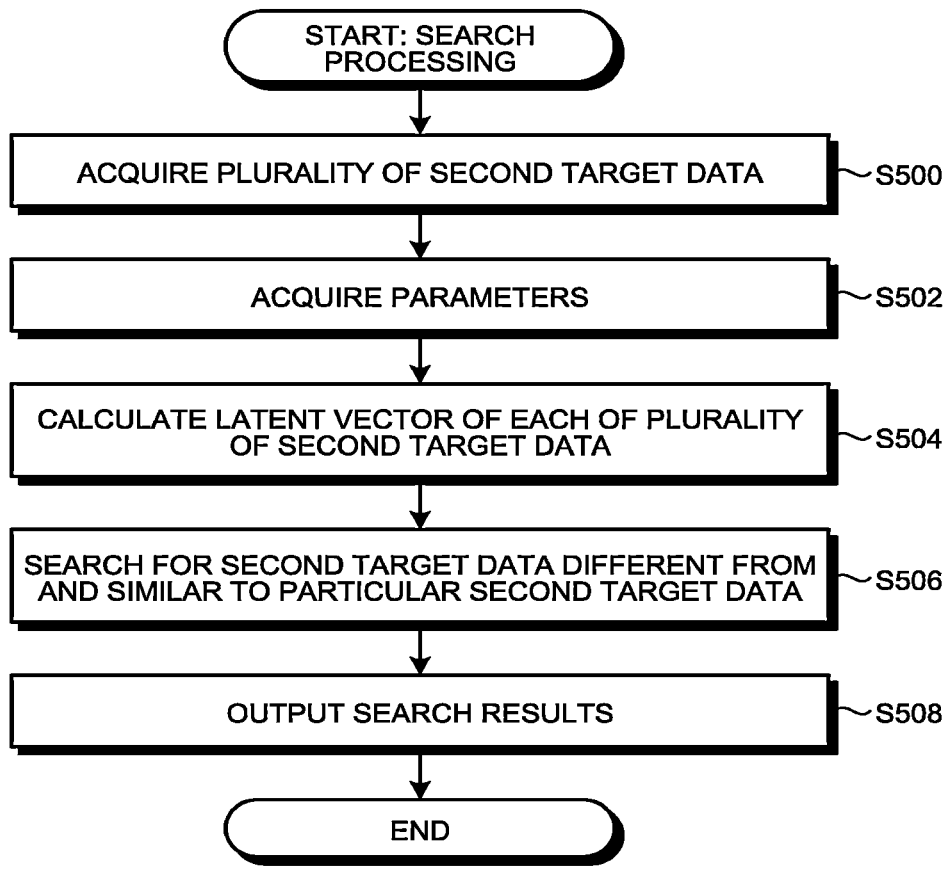

LEARNING DEVICE, LEARNING METHOD, AND COMPUTER PROGRAM PRODUCT

CROSS-REFERENCE TO RELATED APPLICATIONS

This application is based upon and claims the benefit of priority from Japanese Patent Application No. 2020-021893, filed on Feb. 12, 2020; the entire contents of which are incorporated herein by reference.

FIELD

Embodiments described herein relate generally to a learning device, a learning method, and a computer program product.

BACKGROUND

As representation learning methods configured to represent complicated data such as images, voices, and time-series signals by low-dimensional feature vectors, learning methods using no supervised data have been disclosed. For example, a method in which a plurality of data to be searched are assumed to belong to different classes and network parameters are learned such that classification accuracy of the plurality of data increases has been proposed.

Technologies for applying features that are outputs of hidden layers in the learned network to the search for natural images by the neighbor algorithm have been disclosed.

BRIEF DESCRIPTION OF THE DRAWINGS

FIG. 12 is a flowchart illustrating processing for searching for second target data;
FIG. 13 is a diagram illustrating simulation results of classification accuracy.

DETAILED DESCRIPTION

According to an embodiment, a learning device includes one or more processors. The processors calculate a latent vector of each of a plurality of first target data, by using a parameter of a learning model configured to output a latent vector indicating a feature of a target data. The processors calculate, for each first target data, first probabilities that the first target data belongs to virtual classes on an assumption that the plurality of first target data belong to the virtual classes different from each other. The processors update the parameter such that a first loss of the first probabilities, and a second loss that is lower as, for each of element classes to which a plurality of elements included in each of the plurality of first target data belong, a relation with another element class is lower, become lower.

Referring to the accompanying drawings, a learning device, a learning method, and a learning program according to embodiments are described in detail below.

Figure 1:
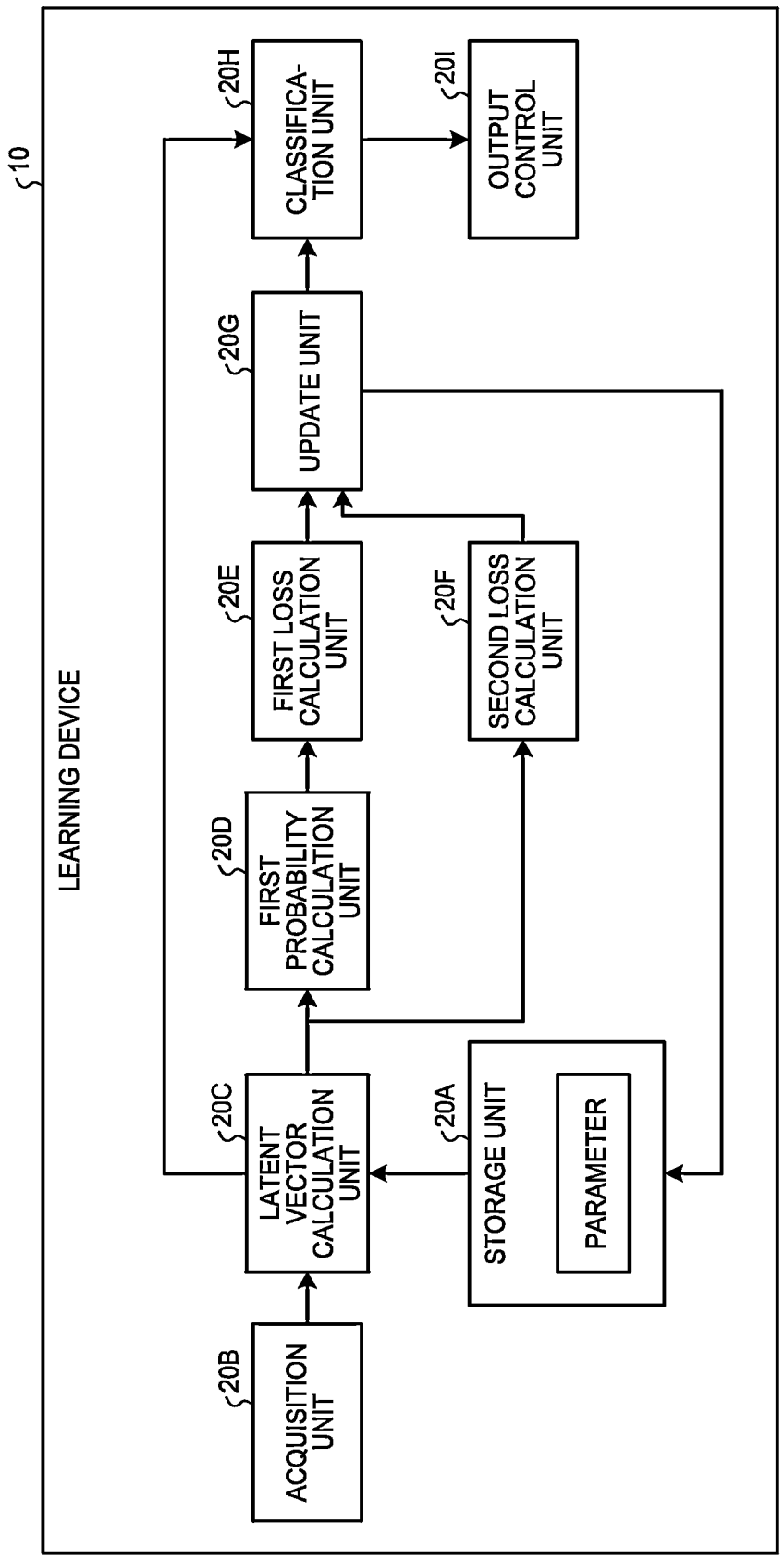
FIG. 1 is a block diagram of a learning device.

FIG. 1 is a block diagram illustrating an example of a learning device 10 according to the present embodiment.

The learning device 10 includes a storage unit 20A, an acquisition unit 20B, a latent vector calculation unit 20C, a first probability calculation unit 20D, a first loss calculation unit 20E, a second loss calculation unit 20F, an update unit 20G, a classification unit 20H, and an output control unit 20I.

The acquisition unit 20B, the latent vector calculation unit 20C, the first probability calculation unit 20D, the first loss calculation unit 20E, the second loss calculation unit 20F, the update unit 20G, the classification unit 20H, and the output control unit 20I are implemented by, for example, one or more processors. For example, each of the above-mentioned units may be implemented by a processor such as a central processing unit (CPU) executing computer programs, that is, by software. Each of the above-mentioned units may be implemented by a processor such as a dedicated IC, that is, by hardware. Each of the above-mentioned units may be implemented by software and hardware in combination. When processors are used, each processor may implement one of the units, or may implement two or more of the units.

The storage unit 20A stores various kinds of data therein. For example, the storage unit 20A is a semiconductor memory element such as a random access memory (RAM) and a flash memory, a hard disk, or an optical disc. Note that the storage unit 20A may be a storage device provided outside the learning device 10. The storage unit 20A may be a storage medium. Specifically, the storage medium may store or temporarily store computer programs and various kinds of information therein by downloading the computer programs and various kinds of information through a local area network (LAN) or the Internet. The storage unit 20A may be configured by a plurality of storage media.

In the present embodiment, the storage unit 20A stores parameters of a learning model therein.

The learning model is a machine learning model configured to output latent vectors of target data from the target data. Examples of the learning model include, but not limited to, a convolutional neural network (CNN).

When target data is image data, for example, a machine learning model for image data is used as a learning model. In this case, the learning device 10 constructs a learning model by, for example, deep learning technology such as deep residual learning (ResNet) described in "HE, Kaiming, et al. Deep residual learning for image recognition. In: Proceedings of the IEEE conference on computer vision and pattern recognition. 2016. pp. 770-778".

In the present embodiment, the case where ResNet is used as a learning model is described as an example.

When a learning model is a CNN, parameters of the learning model include weightings w and biases b, for example. The parameters are updated by processing described later.

Target data is data to be classified. The data to be classified is data to be classified by the learning device 10. Target data is, for example, image data. Specifically, for example, target data is image data on subjects. Target data may be image data in which the backgrounds of subjects are diverse and high dimensional and the distance and the degree of similarity between target data are difficult to calculate. Note that target data may be experimental data indicating experimental results, analysis data indicating analysis results, and test result data indicating test results, and is not limited to image data.

Target data includes a plurality of cases. In the present embodiment, a configuration in which target data includes N cases is described as an example. When target data is image data, one case corresponds to one image. N is an integer of 2 or more.

Each of cases included in target data includes feature information on a feature x_i indicating features of each case. i is identification information on the case. The feature of each case is a d-dimensional feature. d is an integer of 2 or more.

A latent vector indicates features of target data on a latent space. The latent vector is represented by a feature of each of d'-dimensional cases included in target data. The d' dimensions are smaller than the number of d dimensions.

In other words, the latent vector represents target data indicating d-dimensional features by lower d'-dimensional feature vectors. The latent space is a virtual space for mapping the latent vectors of the target data.

The learning device 10 inputs one target data to a learning model, and thereby outputs one latent vector corresponding to the target data.

The learning device 10 in the present embodiment learns parameters of a learning model by processing by the acquisition unit 20B, the latent vector calculation unit 20C, the first probability calculation unit 20D, the first loss calculation unit 20E, the second loss calculation unit 20F, and the update unit 20G described later.

The acquisition unit 20B acquires first target data or second target data. The first target data is an example of target data. The first target data is target data to be classified, and is target data used to learn the parameters. The second target data is an example of target data. The second target data is data to be classified, and is target data other than the first target data used to learn the parameters. In the following, the first target data and the second target data are simply collectively referred to as "target data".

In the present embodiment, the acquisition unit 20B acquires a plurality of first target data. The acquisition unit 20B may acquire the plurality of first target data from the storage unit 20A, or may acquire the plurality of first target data from an external device through a network. In the present embodiment, the storage unit 20A stores the plurality of first target data therein in advance. A configuration in which the acquisition unit 20B acquires the plurality of first target data from the storage unit 20A is described as an example.

The latent vector calculation unit 20C calculates a latent vector of each of the plurality of first target data by using parameters stored in the storage unit 20A.

Figure 2:
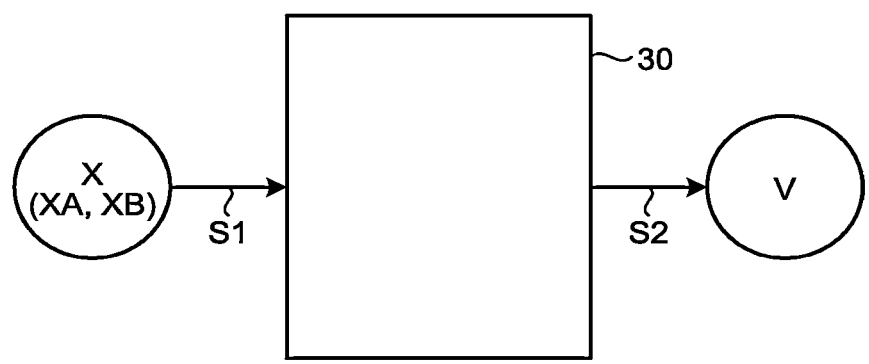
FIG. 2 is a schematic diagram for calculating a latent vector.

FIG. 2 is a schematic diagram illustrating an example of the calculation of the latent vector V. The latent vector calculation unit 20C acquires parameters of a learning model 30 from the storage unit 20A. The latent vector calculation unit 20C inputs d-dimensional target data X to the learning model 30 using the acquired parameters (Step S1). The latent vector calculation unit 20C acquires d'-dimensional latent vectors V output from the learning model 30 to calculate the latent vector V (Step S2).

The latent vector calculation unit 20C calculates, for each of the plurality of first target data XA, a latent vector V by using the learning model 30. Thus, the latent vector calculation unit 20C calculates a plurality of latent vectors V corresponding to the plurality of first target data XA.

Figure 3A:
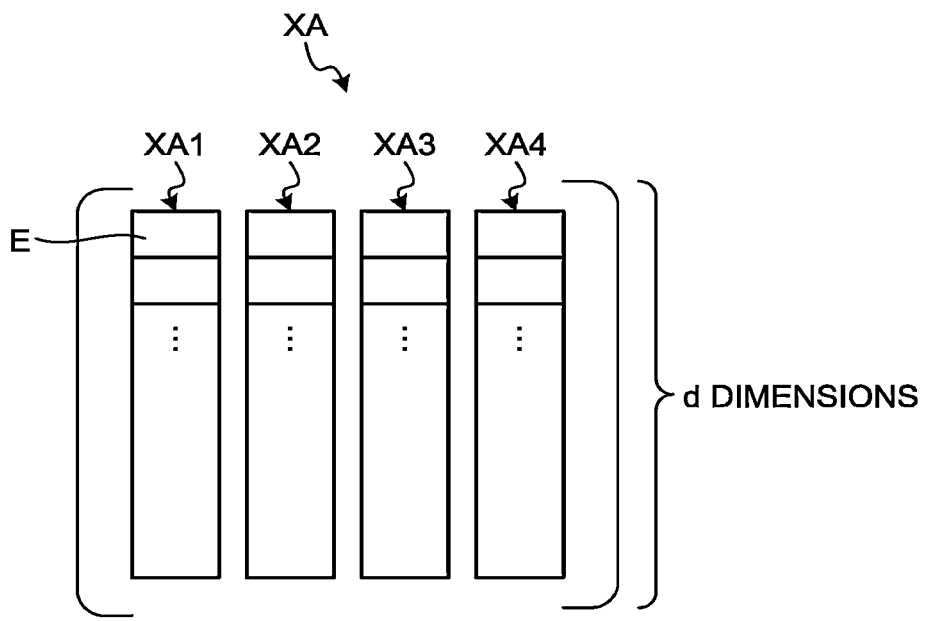
FIG. 3A is a diagram for describing the calculation of the latent vector.
Figure 3B:
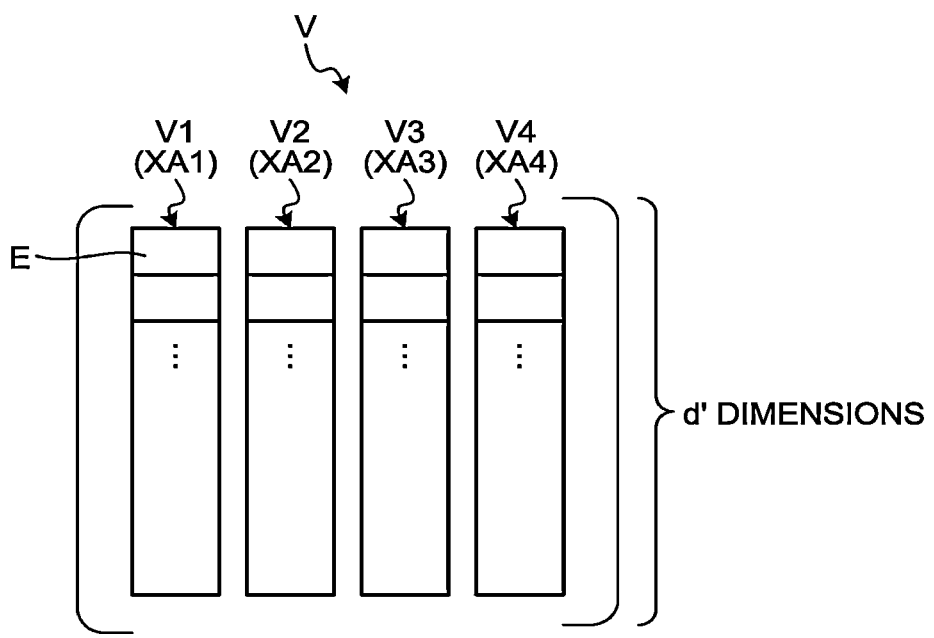
FIG. 3B is a diagram for describing the calculation of the latent vector.

FIG. 3A and FIG. 3B are explanatory diagrams of the calculation of the latent vector V.

For example, as illustrated in FIG. 3A, it is assumed that the acquisition unit 20B acquires the plurality of first target data XA, that is, first target data XA1 to first target data XA4. The first target data XA1 to the first target data XA4 are examples of the first target data XA. Note that the number of the plurality of first target data XA acquired by the acquisition unit 20B only needs to be two or more, and is not limited to four.

As illustrated in FIG. 3B, the latent vector calculation unit 20C calculates, for each of the plurality of first target data XA (target data XA1 to target data XA4) including a plurality of elements E, a latent vector V (latent vector V1 to latent vector V4) by the learning model 30 using the acquired parameters.

Referring back to FIG. 1, description is continued. The latent vector calculation unit 20C outputs the latent vectors V of the plurality of first target data XA to the first probability calculation unit 20D and the second loss calculation unit 20F.

The first probability calculation unit 20D assumes that the plurality of first target data XA belong to different virtual classes from each other. The first probability calculation unit 20D calculates, for each of the plurality of first target data XA, first probabilities that the first target data XA belongs to the virtual classes.

Figures 4, 5:
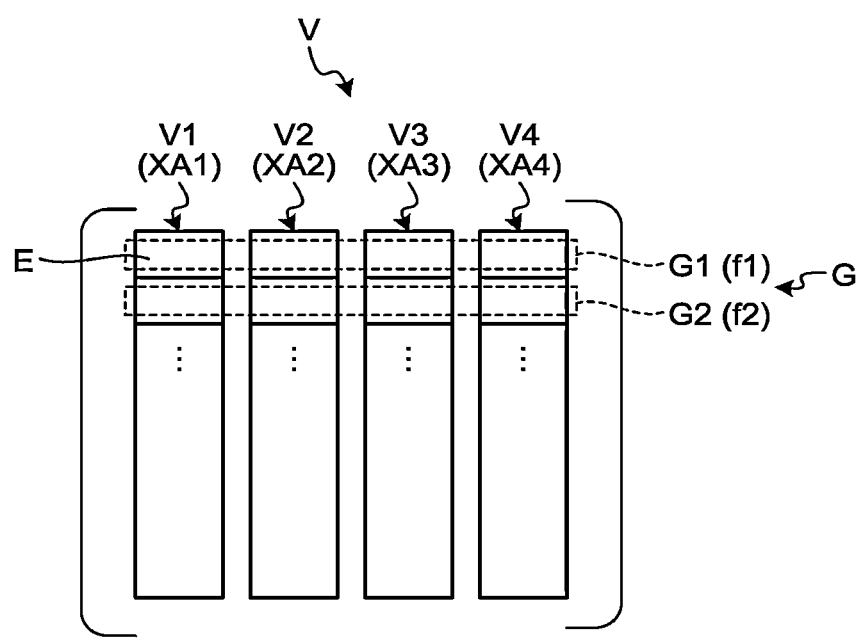
FIG. 4 is a diagram for describing the calculation of a first probability.
FIG. 5 is a diagram for describing the calculation of a second loss.

FIG. 4 is an explanatory diagram of the calculation of the first probability. For example, the first probability calculation unit 20D assumes that first target data XA1 to the first target data XA4 belong to different virtual classes C from each other, that is, a virtual class C1 to a virtual class C4. The first probability calculation unit 20D calculates, for each of the first target data XA1 to the first target data XA4, first probabilities that the target data belongs to the virtual class C1 to the virtual class C4 by using the corresponding latent vectors V.

The first probability calculation unit 20D uses at least one of the distance and the degree of similarity between the latent vectors V of the plurality of first target data XA to calculate a first probability that becomes higher as at least one of the distance and the degree of similarity becomes closer (higher).

Specifically, the first probability calculation unit 20D uses Equation (2 below to calculate the first probability.

$$p_{ij} = \frac{\exp(v_i^T v_j/\tau)}{\sum_{k=1}^{n} \exp(v_k^T v_j/\tau)} \qquad (2)$$

In Equation (2), $P_{ij}$ means a first probability that the i-th first target data XA belongs to the j-th virtual class C. In other words, i is identification information on the first target data XA. j is identification information on the virtual class C. vi represents a latent vector V of the i-th first target data XA. T represents the transposition of a matrix. v_j represents a latent vector V of the j-th first target data XA.

τ is a variable for controlling the magnitude of the difference in first probability. In the present embodiment, τ is a variable for causing the difference between a first probability that one first target data XA belongs to the virtual class C thereof and a first probability that the first target data XA belongs to another virtual class C other than the virtual class C, to be in a predetermined range. The own virtual class C is a virtual class C to which each of the plurality of first target data XA is assumed to belong when virtualizing the virtual classes C. For example, the own virtual class C of the first target data XA1 is the virtual class C1.

As the value of τ becomes smaller, the above-mentioned difference becomes larger, and the value of the first probability that one first target data XA belongs to the virtual class C thereof becomes larger. On the other hand, as the value of τ becomes larger, the above-mentioned difference becomes smaller, and the value of the first probability that one first target data XA belongs to the virtual class C thereof becomes smaller, with the result that one first target data XA belongs to a plurality of virtual classes C.

The learning device 10 only needs to adjust the value of τ in advance such that only the value of the first probability that one first target data XA belongs to the virtual class C thereof is prevented from selectively increasing and that the values of first probabilities indicating the possibilities that the first target data XA belongs to other virtual classes C are calculated.

The value of τ only needs to be determined in advance. For example, it is preferred that the value of τ be 0.1, 0.3, or 0.4.

The above-mentioned predetermined range only needs to be adjusted in advance such that only the value of the first probability that one first target data XA belongs to the virtual class C thereof is prevented from selectively increasing and that the values of first probabilities indicating the possibilities that the first target data XA belongs to other virtual classes C are calculated.

By setting the above-mentioned difference to the above-mentioned predetermined range, a selectively increased first probability is prevented from being calculated for the own virtual class C of the first target data XA. In other words, first probabilities that can recognize that the first target data XA can belong to virtual classes C other than the own virtual class C of the first target data XA are calculated.

The first loss calculation unit 20E outputs, for each of the plurality of first target data XA, the first probability calculated for each virtual class C to the first loss calculation unit 20E.

Referring back to FIG. 1, description is continued. The first loss calculation unit 20E calculates a first loss of the first probability for each of the plurality of first target data XA. Specifically, the first loss calculation unit 20E uses the first probabilities to calculate a first loss that is lower as each first target data of the plurality of first target data XA is easier to be classified into virtual classes C to which the first target data belongs. Specifically, the first loss calculation unit 20E calculates a first loss that is lower as for each first target data of the plurality of first target data XA, the first probability of the virtual class C of the first target data is higher and that is higher as the first probability of a virtual class C other than the virtual class C of the first target data is lower.

Description is given with reference to FIG. 4. For example, it is assumed that the first loss calculation unit 20E calculates a first loss for the first target data XA1. In this case, the first loss calculation unit 20E uses the first probabilities that the first target data XA1 belongs to the virtual class C1 to the virtual class C4. The first loss calculation unit 20E calculates a first loss that is lower as the first probability of the virtual class C1 to which the first target data XA1 is supposed to belong is higher and that is lower as the first probabilities of the virtual class C2 to the virtual class C4 is lower. Through this processing, the first loss calculation unit 20E calculates one first loss for one first target data XA.

Specifically, the first loss calculation unit 20E uses Equation (3) below to calculate the first loss.

$$L\_1 = -\sum_{i=1}^{n} \log p_{ii} \quad (3)$$

In Equation (3), L_1 represents the first loss. $P_{ii}$ represents a probability that the i-th first target data XA belongs to the virtual class C thereof. In Equation (3), n has the same meaning as the above-mentioned N, and is the number of cases included in the first target data XA.

For example, the first target data XA1 is assumed. In this case, a first loss that is lower as the first probability that the first target data XA1 belongs to the virtual class C1 thereof is higher is calculated.

Referring back to FIG. 1, description is continued. The first loss calculation unit 20E outputs the first loss calculated for each first target data XA to the update unit 20G.

Next, the second loss calculation unit 20F is described.

The second loss calculation unit 20F calculates a second loss that is lower as, for each of element classes to which elements E included in each of the plurality of first target data XA belong, the relation with another element class is lower.

FIG. 5 is an explanatory diagram of the calculation of the second loss. Elements E included in each of the plurality of first target data XA1 to first target data XA4 are classified into a plurality of element classes G depending on the feature to which the element E belongs. By the latent vector calculation unit 20C, each element class G includes information useful for image classification, such as "color of sky" and "color of eyes". FIG. 5 illustrates four element classes G (element class G1 to element class Gd' (d'=4)) as an example. In the present embodiment, the number of the element classes G is equal to the number of d' dimensions. The vector of the element class Gi is represented by fi. fi is a vector having N dimensions of the number of data.

The second loss calculation unit 20F calculates a second loss that is lower as, for each of the element classes G, the relation with another element class G is lower. The relation represents at least one of the degree of similarity of features, the distance, and the correlation. A low relation means at least one of a small degree of similarity of features, a large distance, and a small correlation.

Specifically, the second loss calculation unit 20F uses Equation (4) below to calculate the second loss.

$$L\_2 = 1\|f^T - I\|^2 \quad (4)$$

In Equation (4), L_2 represents the second loss. In Equation (4), f represents latent vectors of cases included in target data X, and I represents an identity matrix having the same numbers of rows and columns as those of the latent vector. Specifically, I means an identity matrix having the same numbers of rows d' and columns d' as the number of element classes G.

In other words, the second loss calculation unit 20F calculates, as a second loss, the square of the absolute value of the difference between the product ($VV^T$) of a matrix of latent vectors V of the plurality of first target data XA and a transposed matrix of the latent vectors V of the plurality of first target data XA and the identity matrix having the same numbers of rows and columns as the element classes G.

$VV^T$ of the plurality of first target data XA approximates the identity matrix. Thus, the value of the second loss is smaller as a group of elements E in an element class G and a group of elements E in another element class G are less correlated and more independent. Being independent with no correlation means being independent with no relation.

When the element classes G take values independently, the element classes G output from the latent vector calculation unit 20C are each considered to successfully learn information useful for classification such as "color of sky" and "color of eyes".

The second loss calculation unit 20F can also calculate the second loss by using Equation (1) below.

$$L\_2 = -\sum_{i=1}^{n} \log \frac{\exp(f_i f_i^T / \tau')}{\sum_{k=1}^{n} \exp(f_k f_i^T / \tau')} \quad (1)$$

In Equation (1), L_2 represents the second loss, and fi represents a vector for each element E extracted from latent vectors for the i-th case included in the first target data XA. In Equation (1), n is the number of dimensions of the latent vectors, and corresponds to the above-mentioned d' as the number of dimensions. τ' is a variable for controlling the magnitude of the difference in second loss calculated by Equation (1). Equation (1) takes a lower value as the correlation between element classes G in the i-th and k-th first target data XA becomes smaller. The second loss has an effect to control the element classes G to take values independently, and the element classes G output from the latent vector calculation unit 20C can learn information useful for classification.

Referring back to FIG. 1, description is continued. The second loss calculation unit 20F outputs the second loss calculated for each of the element classes G to the update unit 20G.

The update unit 20G receives the first loss for the plurality of first target data XA from the first loss calculation unit 20E. The update unit 20G receives the second loss for the element classes G from the second loss calculation unit 20F. The update unit 20G updates the parameters such that both of the received first loss and the received second loss become lower. Specifically, the update unit 20G updates the parameters such that the received first loss and the received second loss are lower than the first loss and the second loss calculated by the above-mentioned processing by using the learning model 30 the parameters of which are currently stored in the storage unit 20A.

Specifically, the update unit 20G calculates the parameters such that a loss function expressed by Equation (5) below becomes lower.

$$L = L\_1 + aL\_2 \quad (5)$$

In Equation (5), L represents the loss function. L_1 represents the first loss. L_2 represents the second loss. a is a weighting of the second loss, and is a positive real number. a only needs to be determined in advance depending on the type of target data X. In the present embodiment, the case where a=1 is described as an example.

The update unit 20G uses Equation (5) above to calculate the parameters by using stochastic gradient descent, which is used for learning of neural networks, for example.

The update unit 20G stores the calculated parameters in the storage unit 20A, thereby updating the parameters stored in the storage unit 20A with the calculated parameters.

Through the update processing, the parameters of the learning model 30 are updated.

In other words, the learning device 10 learns the parameters of the learning model 30 through the above-mentioned processing such that both of the first loss and the second loss become smaller.

Furthermore, the update unit 20G may determine whether a learning finish criterion is satisfied. When it is determined that the learning finish criterion is satisfied, the learning device 10 may finish the learning of the parameters. When it is determined that the learning finish criterion is not satisfied, the acquisition unit 20B, the latent vector calculation unit 20C, the first probability calculation unit 20D, the first loss calculation unit 20E, the second loss calculation unit 20F, and the update unit 20GH may repeat the above-mentioned series of processing again.

The learning finish criterion only needs to be determined in advance. Examples of the learning finish criterion include the number of times of learning set in advance and the number of times by which the reduction rate of at least one of the first loss and the second loss is less than a threshold.

Next, the classification unit 20H is described. The classification unit 20H classifies target data X by unsupervised clustering. In the present embodiment, the classification unit 20H classifies the plurality of first target data XA into a plurality of clusters based on latent vectors V of the plurality of first target data XA.

Specifically, the latent vector calculation unit 20C calculates latent vectors V of the plurality of first target data XA by using the learning model 30 the parameters of which have been updated by the update unit 20G. In the following, the learning model 30 the parameters of which have been updated by the update unit 20G is sometimes referred to as "learning model 30 the parameters of which have been updated".

The classification unit 20H classifies the plurality of first target data XA into clusters by using at least one of the distance and the degree of similarity between the calculated latent vectors V.

Figure 6:
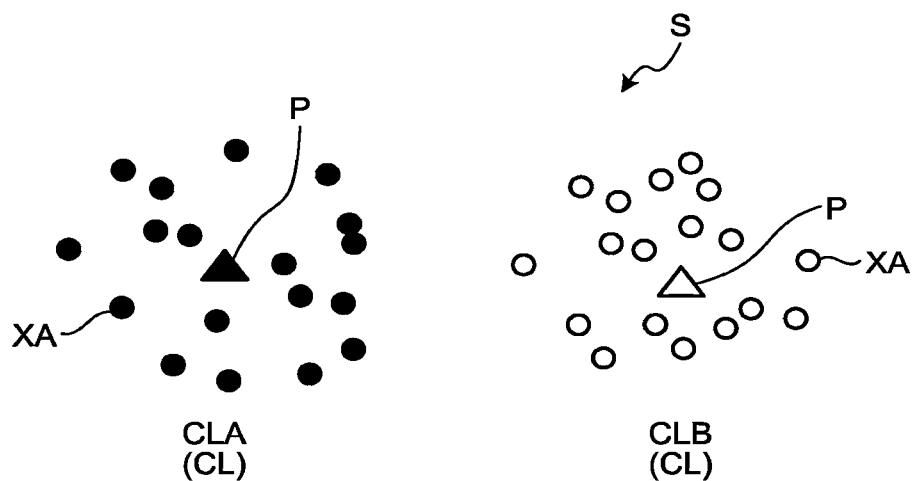
FIG. 6 is an explanatory diagram of clustering.

FIG. 6 is an explanatory diagram of an example of clustering by the classification unit 20H. FIG. 6 illustrates an example in which the plurality of first target data XA are disposed in a latent space S depending on latent vectors V. For example, the classification unit 20H uses latent vectors V calculated by using the learning model 30 the parameters of which have been updated to cluster the plurality of first target data XA by an unsupervised clustering method.

For example, publicly known Kmeans can be used as an unsupervised clustering method. In Kmeans, the number K (K is an integer of 2 or more) of clusters CL into which the plurality of target data X are classified is designated to generate K cluster centers P as initial values. FIG. 6 illustrates an example in which the number of clusters "2" is designated. In other words, FIG. 6 illustrates a cluster CLA and a cluster CLB as an example of the clusters CL. The classification unit 20H generates the cluster centers P of the cluster CLA and the cluster CLB.

In the present embodiment, the distances between the cluster center P and each of the latent vectors V of the plurality of first target data XA are used to repeatedly allocate the first target data XA to the clusters CL and calculate the positions of the cluster centers P.

Through the processing, the classification unit 20H classifies the plurality of first target data XA into the clusters CL.

Referring back to FIG. 1, description is continued. The classification unit 20H may further execute search processing based on the latent vectors V calculated by using the learning model 30 the parameters of which have been updated.

For example, the classification unit 20H may search for another first target data XA similar to particular first target data XA among the plurality of first target data XA by using at least one of the distance and the degree of similarity between the latent vectors V. In other words, the classification unit 20H may use the latent vectors V calculated by using the learning model 30 the parameters of which have been updated to search for another first target data XA similar to particular first target data XA by the publicly known nearest neighbor algorithm.

The output control unit 20I outputs at least one of the classification results and the search results obtained by the classification unit 20H. For example, the output control unit 20I outputs at least one of the classification results and the search results to an output device electrically connected to the learning device 10. Examples of the output device include a display, a speaker, and an external device connected through a network. Note that the output control unit 20I may store at least one of the classification results and the search results in the storage unit 20A.

Note that the classification unit 20H may classify second target data XB. As described above, the second target data XB is target data X other than the first target data XA that is target data X used to learn the parameters.

In this case, the acquisition unit 20B acquires the plurality of first target data XA and one or more second target data XB. The latent vector calculation unit 20C uses the learning model 30 the parameters of which have been updated to calculate latent vectors V of the plurality of first target data XA and one or more second target data XB.

The classification unit 20H calculates, for each cluster CL, a classification statistical value of the latent vector V of each of the plurality of first target data XA calculated by using the learning model 30 the parameters of which have been updated. The classification unit 20H classifies the second target data XB into any of clusters based on the latent vector V of the second target data XB and the classification statistical value.

Figure 7:
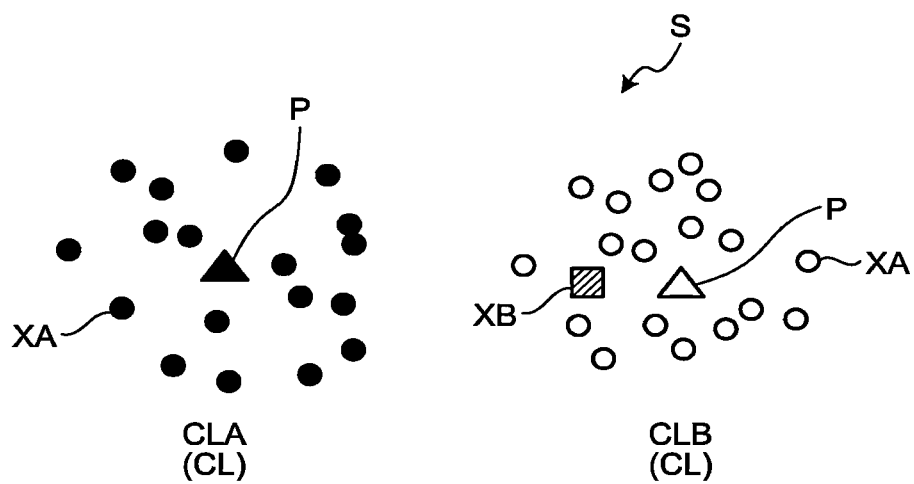
FIG. 7 is an explanatory diagram of classification of second target data.

FIG. 7 is an explanatory diagram of an example of the classification of the second target data XB. FIG. 7 illustrates an example in which the first target data XA and the second target data XB are disposed in the latent space S depending on latent vectors V.

For example, the classification unit 20H classifies the plurality of first target data XA into clusters CL by using the latent vectors V of the plurality of first target data XA calculated by using the learning model 30 the parameters of which have been updated. FIG. 7 illustrates an example in which the plurality of first target data XA are classified into a cluster CLA and a cluster CLB.

The classification unit 20H calculates, for each of the cluster CLA and the cluster CLB, classification statistical values of latent vectors V of the first target data XA belonging to the cluster CL. The classification statistical value includes an average value of the latent vectors V of the first target data XA belonging to each cluster CL. The average value of the latent vectors V corresponds to, for example, the cluster center P of each cluster CL.

The classification unit 20H acquires a latent vector V of the second target data XB calculated by using the learning model 30 the parameters of which have been updated from the latent vector calculation unit 20C. The latent vector calculation unit 20C only needs to input the second target data XB to the learning model 30 the parameters of which have been updated, thereby acquiring the latent vector V of the second target data XB as output information from the learning model 30.

The classification unit 20H specifies a cluster CL having a classification statistical value indicating the closest distance and degree of similarity with respect to the latent vector V of the second target data XB. The classification unit 20H classifies the second target data XB into the specified cluster CL. In other words, the classification unit 20H classifies the second target data XB into any one of the clusters CL by using the distance between the latent vector V of the second target data XB and the cluster center P of the cluster CL.

In the case of the example illustrated in FIG. 7, the second target data XB is present in the latent space S at a position closer to the cluster center P of the cluster CLB than the cluster center P of the cluster CLA. In this case, the classification unit 20H classifies the second target data XB into the cluster CLB.

Note that the method for classifying the second target data XB is not limited to the above-mentioned classification method.

For example, the classification unit 20H may classify the second target data XB by using latent vectors V of the plurality of first target data XA and a latent vector V of the second target data XB calculated by using the learning model 30 the parameters of which have been updated.

In this case, the acquisition unit 20B acquires the plurality of first target data XA and one or more second target data XB. The latent vector calculation unit 20C uses the learning model 30 the parameters of which have been updated to calculate latent vectors V of the plurality of first target data XA and one or more second target data XB.

The classification unit 20H specifies a cluster CL to which the first target data XA belongs, the first target data XA having the latent vector V whose distance and degree of similarity with respect to the latent vector V of the second target data XB calculated by using the learning model 30 the parameters of which have been updated are closest belongs. Note that the classification unit 20H may specify a cluster CL to which the largest number of latent vectors V whose distance and degree of similarity with respect to the latent vector V of the second target data XB are within a predetermined range belong.

The classification unit 20H classifies the second target data XB into the specified cluster CL.

Note that the classification unit 20H may further execute search processing for searching for another second target data XB similar to particular second target data XB among the plurality of second target data XB.

In this case, the classification unit 20H acquires latent vectors V of the plurality of second target data XB calculated by using the learning model 30 the parameters of which have been updated from the latent vector calculation unit 20C. The classification unit 20H only needs to use the acquired latent vectors V to search for another second target data XB similar to particular second target data XB among the plurality of second target data XB.

For example, the classification unit 20H searches for another second target data XB similar to particular second target data XB among the plurality of second target data XB by using at least one of the distance and the degree of similarity between latent vectors V. In other words, the classification unit 20H may use the latent vectors V of the second target data XB calculated by using the learning model 30 the parameters of which have been updated to search for another second target data XB similar to particular second target data XB by the publicly known nearest neighbor algorithm.

Next, an example of the flow of learning processing executed by the learning device 10 is described.

Figure 8:
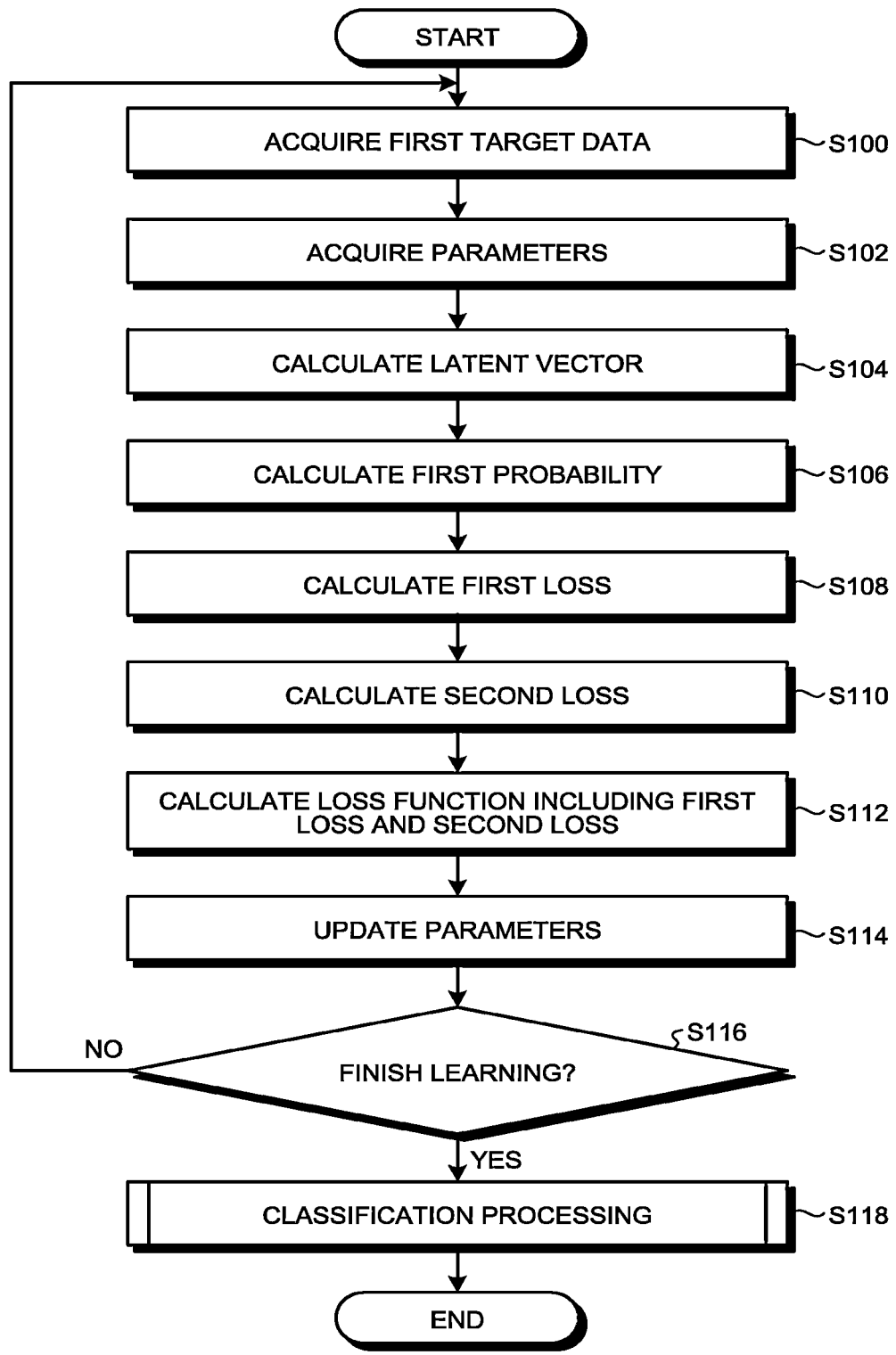
FIG. 8 is a flowchart illustrating the flow of learning processing.

FIG. 8 is a flowchart illustrating an example of the flow of learning processing executed by the learning device 10.

First, the acquisition unit 20B acquires the plurality of first target data XA (Step S100). The latent vector calculation unit 20C acquires parameters of the learning model 30 from the storage unit 20A (Step S102).

The latent vector calculation unit 20C calculates, for each of the plurality of first target data XA acquired at Step S100, a latent vector V by using the learning model 30 for which the parameters acquired at Step S102 have been set (Step S104).

Next, the first probability calculation unit 20D calculates, for each of the plurality of first target data XA acquired at Step S100, first probabilities that the first target data XA belongs to virtual classes C by using the latent vector V calculated at Step S104 (Step S106).

The first loss calculation unit 20E uses the first probability calculated at Step S106 to calculate, for each of the plurality of first target data XA, a first loss of the first probabilities (Step S108).

The second loss calculation unit 20F uses the latent vector V calculated at Step S104 to calculate a second loss that is lower as, for each of element classes G to which elements E included in each of the plurality of first target data XA belong, the relation with another element class G is lower (Step S110).

The update unit 20G calculates a loss function including the first loss calculated at Step S108 and the second loss calculated at Step S110 (Step S112). The update unit 20G calculates parameters such that the loss function calculated at Step S112 becomes lower, and stores the parameters in the storage unit 20A (Step S114). Through the processing at Step S114, the parameters of the learning model 30 are updated.

Next, the update unit 20G determines whether a learning finish criterion is satisfied (Step S116). When it is determined that the learning finish criterion is not satisfied (No at Step S116), the flow returns to Step S100 described above. On the other hand, when it is determined that the learning finish criterion is satisfied (Yes at Step S116), the flow proceeds to Step S118.

At Step S118, the classification unit 20H executes classification processing for classifying target data X by using the learning model 30 the parameters of which have been updated by the processing at Step S114 (Step S118). This routine is finished.

Figure 9:
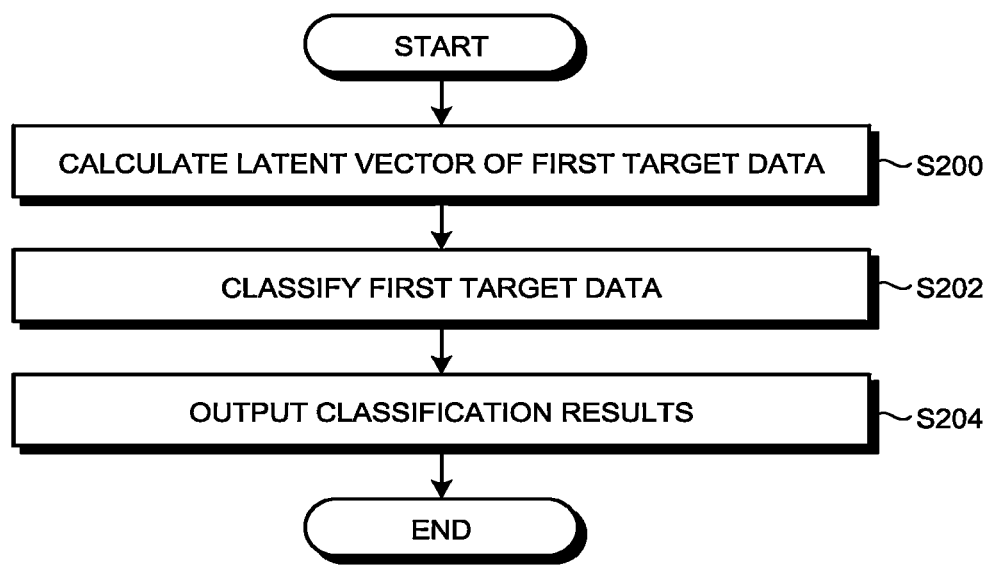
FIG. 9 is a flowchart illustrating the flow of classification processing.

FIG. 9 is a flowchart illustrating an example of the flow of the classification processing (Step S118, see FIG. 8)

The latent vector calculation unit 20C calculates a latent vector V of each of the plurality of first target data XA by using the learning model 30 the parameters of which have been updated by the processing at Step S114 (see FIG. 8) (Step S200).

The classification unit 20H classifies the plurality of first target data XA into clusters CL by using at least one of the distance and the degree of similarity between the latent vectors V calculated at Step S200 (Step S202).

The output control unit 20I outputs the classification results at Step S202 (Step S204). This routine is finished.

Next, the flow of classification processing of the second target data XB is described as classification processing executed by the classification unit 20H.

Figure 10:
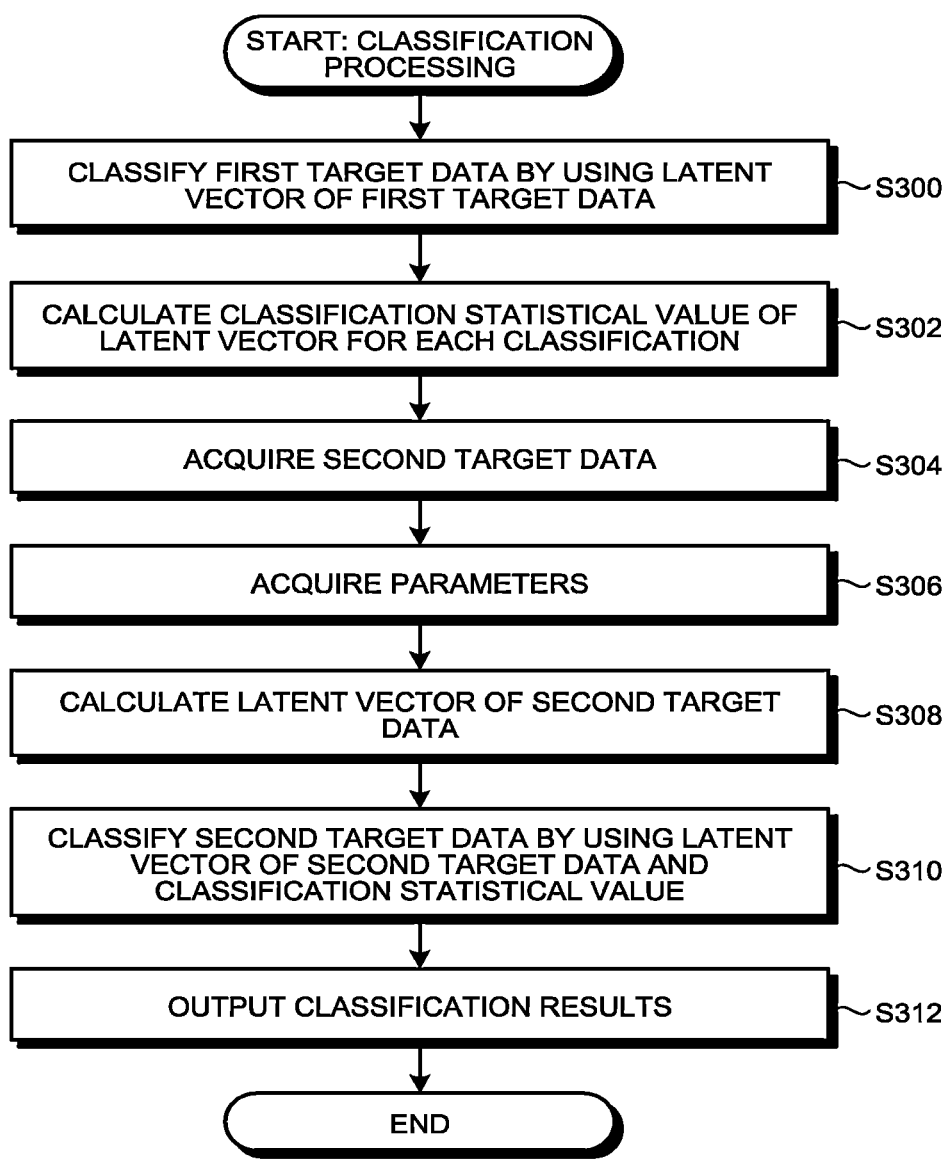
FIG. 10 is a flowchart illustrating the flow of classification processing for second target data XB using classification statistical values.

FIG. 10 is a flowchart illustrating an example of the flow of the classification processing (Step S118, see FIG. 8) of the second target data XB using classification statistical values.

First, the latent vector calculation unit 20C calculates a latent vector V of each of the plurality of first target data XA by using the learning model 30 the parameters of which have been updated by the processing at Step S114 (see FIG. 8). The classification unit 20H classifies the plurality of first target data XA into clusters CL by using at least one of the distance and the degree of similarity between the calculated latent vectors V (Step S300). The processing at Step S300 is the same as Step S200 to Step S202 (see FIG. 9).

The classification unit 20H calculates, for each cluster CL classified at Step S300, a classification statistical value of each of the latent vectors V of the first target data XA belonging to the cluster CL (Step S302).

Next, the acquisition unit 20B acquires second target data XB (Step S304). The latent vector calculation unit 20C acquires the parameters of the learning model 30 from the storage unit 20A (Step S306). The latent vector calculation unit 20C calculates, for each of one or more second target data XB acquired at Step S304, a latent vector V by using the learning model 30 for which the parameters acquired at Step S306 have been set (Step S308).

The classification unit 20H classifies the second target data XB by using the latent vector V of the second target data XB calculated at Step S308 and the classification statistical value of each cluster CL calculated at Step S302 (Step S310).

The output control unit 20I outputs the classification results at Step S310 (Step S312). This routine is finished.

Next, the flow of the classification processing (Step S118, see FIG. 8) of the second target data XB using latent vectors V of the first target data XA and the second target data XB is described.

Figure 11:
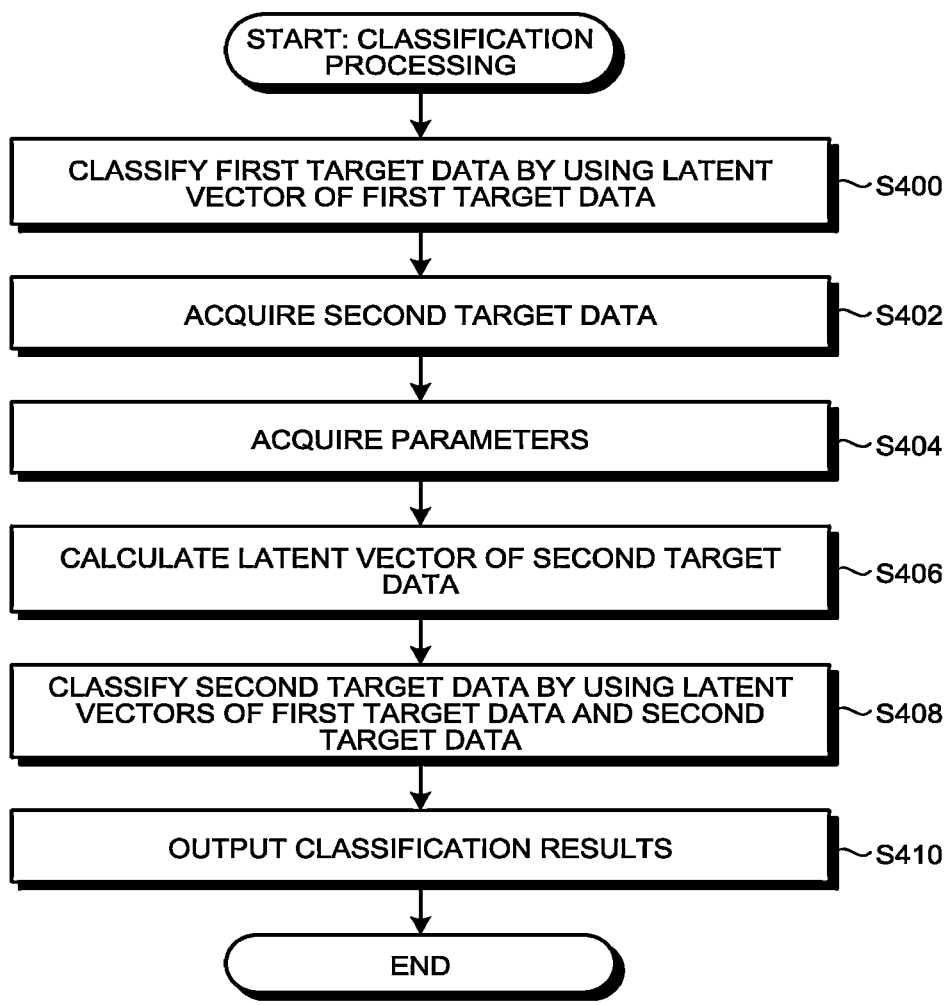
FIG. 11 is a flowchart illustrating the flow of classification processing for second target data.

FIG. 11 is a flowchart illustrating an example of the flow of the classification processing (Step S118, see FIG. 8) of the second target data XB using latent vectors V of the first target data XA and the second target data XB.

First, the latent vector calculation unit 20C calculates a latent vector V of each of the plurality of first target data XA by using the learning model 30 the parameters of which have been updated by the processing at Step S114 (see FIG. 8). The classification unit 20H classifies the plurality of first target data XA into clusters CL by using at least one of the distance and the degree of similarity between the calculated latent vectors V (Step S400). The processing at Step S400 is the same as Step S300 (see FIG. 10).

Next, the acquisition unit 20B acquires second target data XB (Step S402). The latent vector calculation unit 20C acquires the parameters of the learning model 30 from the storage unit 20A (Step S404). The latent vector calculation unit 20C calculates, for each of one or more second target data XB acquired at Step S402, a latent vector V by using the learning model 30 for which the parameters acquired at Step S404 have been set (Step S406).

The classification unit 20H classifies the second target data XB by using the latent vectors V of the first target data XA and the second target data XB calculated at Step S400 and Step S406, respectively (Step S408).

The output control unit 20I outputs the classification results at Step S408 (Step S410). This routine is finished.

Next, the flow of search processing among the plurality of second target data XB is described.

FIG. 12 is a flowchart illustrating an example of the flow of search processing among the plurality of second target data XB.

The acquisition unit 20B acquires the plurality of second target data XB (Step S500). The latent vector calculation unit 20C acquires parameters of the learning model 30 from the storage unit 20A (Step S502). The latent vector calculation unit 20C uses the learning model 30 for which the parameters acquired at Step S502 have been set to calculate a latent vector V for each of the plurality of second target data XB acquired at Step S500 (Step S504).

The classification unit 20H uses the latent vector V calculated at Step S504 to search for a second target data XB different from and similar to particular second target data XB among the plurality of second target data XB (Step S506).

The output control unit 20I outputs the search result at Step S506 (Step S508). This routine is finished.

As described above, the learning device 10 in the present embodiment includes the latent vector calculation unit 20C, the first probability calculation unit 20D, the first loss calculation unit 20E, the second loss calculation unit 20F, and the update unit 20G. The latent vector calculation unit 20C uses the parameters of the learning model 30, which outputs the latent vector V indicating features of the target data X on the latent space S from the target data X, to calculate a latent vector V of each of the plurality of first target data XA that are the target data X to be classified. The first probability calculation unit 20D calculates, for each of the plurality of first target data XA, first probabilities that the first target data XA belongs to virtual classes C on the assumption that the plurality of first target data XA belong to virtual classes C different from each other. The first loss calculation unit 20E calculates a first loss of the first probabilities for each of the plurality of first target data XA. The second loss calculation unit 20F calculates a second loss that is lower as, for each of element classes G to which elements E included in each of the plurality of first target data XA belong, the relation with another element class G is lower. The update unit 20G updates the parameters such that the first loss and the second loss become lower.

Conventional technologies are sometimes inappropriate for clustering to classify similar target data X. In particular, in the conventional technologies, clustering accuracy sometimes decreases as target data becomes complicated such as image data on generic objects whose backgrounds are diverse.

For example, a conventional technology in which target data X are classified by unsupervised clustering without using the first loss and the second loss in the present embodiment is assumed. In this case, target data X are classified by using a distance between the target data X and a cluster center P. Thus, in the conventional technology, as the target data X becomes complicated, the distance between the target data X and the cluster center P cannot be appropriately calculated, and the clustering accuracy may decrease.

For another example, as a conventional technology, unsupervised clustering technology in which only the first loss is used to update the parameters of a learning model such that the first loss becomes lower is assumed. The use of only the first loss is sometimes inappropriate for clustering to classify similar target data X into clusters. In the conventional technology, appropriate learning cannot always be performed for clustering to group data, and clustering accuracy may decrease.

In the learning device 10 in the present embodiment, on the other hand, the first loss and the second loss are used to update the parameters of the learning model 30 such that both of the first loss and the second loss become lower. Thus, the learning device 10 in the present embodiment can learn the parameters of the learning model 30 suited for clustering of target data X.

In other words, in the learning device 10, target data X is classified by using latent vectors V calculated by using the learning model 30 the parameters of which have been updated by the update unit 20G, and hence the clustering accuracy of unsupervised clustering can be improved.

FIG. 13 is a diagram illustrating an example of simulation results of classification accuracy of target data X. Note that, in FIG. 13, image data including subjects such as airplanes, ships, dogs, and cats were used as target data X. The classification accuracy indicates the degree of match between the classification result and the class by %.

In FIG. 13, "Kmeans" and classification accuracy corresponding to "Kmeans" represent the follows. The classification accuracy is obtained by using latent vectors calculated by using a learning model that is learned without using the first loss and the second loss, and means classification accuracy obtained by using the latent vectors to classify the target data X by the publicly known Kmeans.

In FIG. 13, "first loss" and classification accuracy corresponding to "first loss" represent the follows. The classification accuracy is obtained by using latent vectors calculated by a learning model learned by using a first loss but not using a second loss, and means classification accuracy obtained by using the latent vectors to classify the target data X by the publicly known Kmeans.

In FIG. 13, "first loss+second loss" and classification accuracy corresponding to "first loss+second loss" mean classification accuracy obtained when the learning device 10 in the present embodiment classifies target data X.

As illustrated in FIG. 13, the classification accuracy using the conventional "Kmeans" was 22.9%, but the classification accuracy of the learning device 10 in the present embodiment was greatly improved to 81.2%. The classification accuracy without using the second loss was 75.9%. Thus, it can be said that the classification accuracy was greatly improved in the learning device 10 in the present embodiment.

Figure 14A:
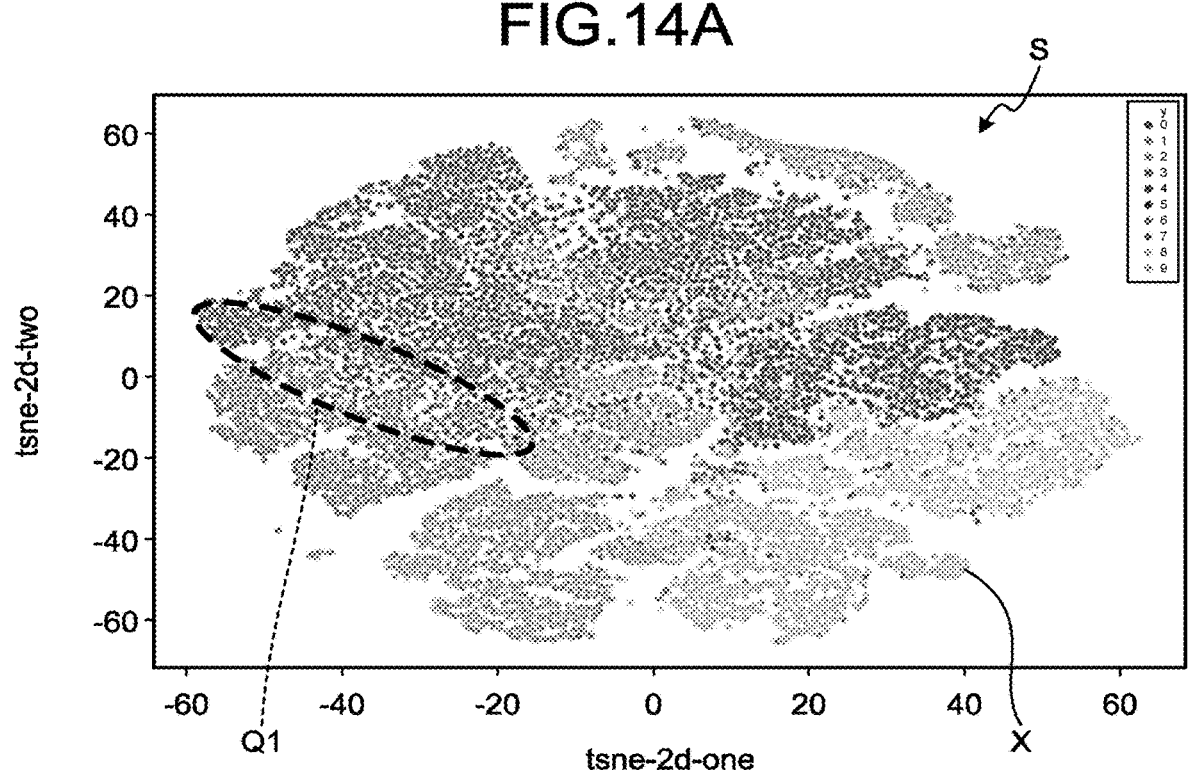
FIG. 14A is a schematic diagram illustrating a distribution of conventional target data.
Figure 14B:
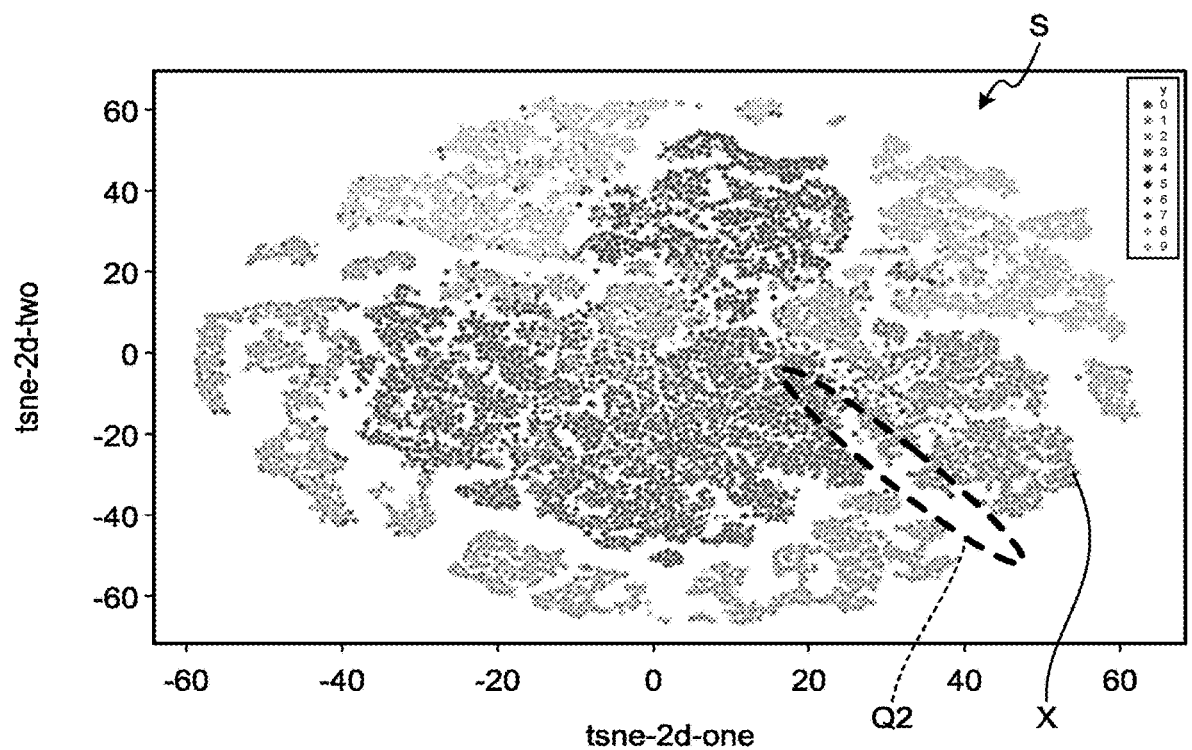
FIG. 14B is a schematic diagram illustrating a distribution of target data.

FIG. 14A and FIG. 14B are schematic diagrams illustrating an example of distribution of target data X in the latent space S. FIG. 14A illustrates a conventional example. Specifically, FIG. 14A illustrates an example in which target data X having latent vectors calculated by using a learning model learned without using the second loss are disposed in the latent space S. FIG. 14B illustrates an example in which target data X having latent vectors V calculated by the learning device 10 in the present embodiment are disposed in the latent space S.

As illustrated in FIG. 14A, in the classification of the target data X by the conventional method, a space Q1 in which target data X are dense is present between groups of target data X classified into clusters CL. On the other hand, in the classification of the target data X by the learning device 10 in the present embodiment, a space Q2 in which target data X are sparse is present between groups of target data X classified into clusters CL. Thus, in the learning device 10 in the present embodiment, it can be said that a difference is easily produced in distance among the plurality of target data X, and the classification accuracy can be improved.

As described above, in the learning device 10 in the present embodiment, the first loss and the second loss are used to update the parameters of the learning model 30 such that both of the first loss and the second loss become lower. Thus, the learning device 10 in the present embodiment can learn the parameters of the learning model 30 suited for clustering of target data X.

Therefore, the learning device 10 in the present embodiment can improve the clustering accuracy.

The classification unit 20H classifies target data X by using the learning model 30 the parameters of which have been updated by the update unit 20G. Thus, in addition to the above-mentioned effect, the learning device 10 in the present embodiment can improve the clustering accuracy for both of the first target data XA and the second target data XB.

The classification unit 20H searches for another target data X similar to particular target data X by using the learning model 30 the parameters of which have been updated by the update unit 20G. Thus, in addition to the above-mentioned effects, the learning device 10 in the present embodiment can improve the search accuracy for both of the first target data XA and the second target data XB.

The learning device 10 in the present embodiment can perform accurate clustering and searching without learning new parameters for second target data XB, which is target data X other than first target data XA used to learn parameters.

As described above, in the learning device 10 in the present embodiment, it is preferred to use, as t that is a variable for controlling the magnitude of the difference in first probability indicated in Equation (2) above, a variable for setting the above-mentioned difference to a predetermined range. The above-mentioned difference is, as described above, a difference between a first probability that one first target data XA belongs to a correct virtual class C of the first target data XA and a first probability that the first target data XA belongs to a virtual class C other than the virtual class C.

As described above, it is preferred that the learning device 10 adjust in advance the value of t to a value equal to or larger than a threshold such that only the value of the first probability that one first target data XA belongs to the virtual class C thereof is prevented from selectively increasing and that the values of first probabilities indicating the possibilities that the first target data XA belongs to other virtual classes C are calculated.

For example, it is assumed that a threshold "0.4" was set as T. In this case, it was confirmed from a simulation that the classification accuracy of target data X was able to be improved as compared with the case where "0.075", which is a value lower than the threshold, was set as 1.

Next, an example of a hardware configuration of the learning device 10 in the above-mentioned embodiment is described.

Figure 15:
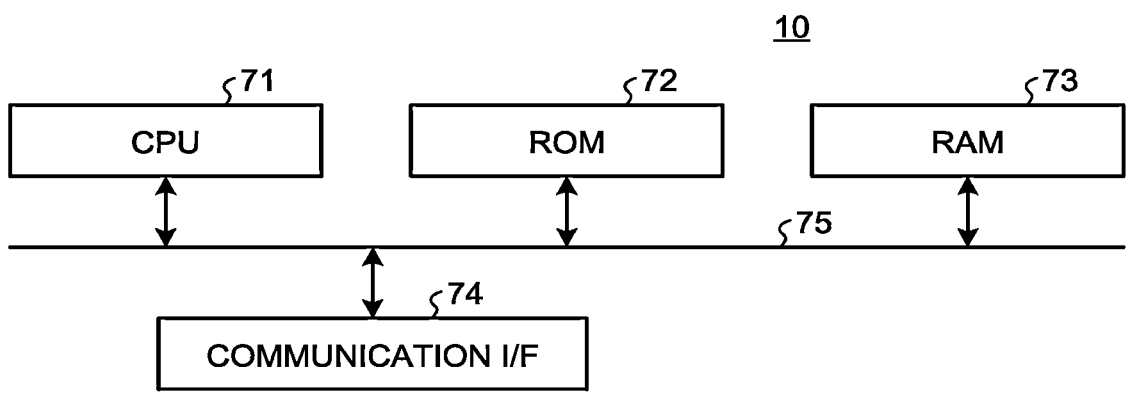
FIG. 15 is a hardware configuration diagram.

FIG. 15 is an example of a hardware configuration diagram of the learning device 10 in the above-mentioned embodiment.

The learning device 10 in the above-mentioned embodiment has a hardware configuration using a general computer, in which a CPU 71, a read only memory (ROM) 72, a random access memory (RAM) 73, and an I/F 74 are mutually connected by a bus 75.

The CPU 71 is an arithmetic device configured to control the learning device 10 in the above-mentioned embodiment. The ROM 72 stores therein computer programs for implementing various kinds of processing by the CPU 71. The RAM 73 stores therein data necessary for various kinds of processing by the CPU 71. The I/F 74 is an interface connected to an output unit 16 and a driving control unit 62, and configured to transmit and receive data.

In the learning device 10 in the above-mentioned embodiment, the CPU 71 reads computer programs from the ROM 72 onto the RAM 73 and executes the computer programs, so that each of the above-mentioned functions is implemented on the computer.

Note that computer programs for executing each of the above-mentioned pieces of processing executed by the learning device 10 in the above-mentioned embodiment may be stored in a hard disk drive (HDD). The computer programs for executing each of the above-mentioned pieces of processing executed by the learning device 10 in the above-mentioned embodiment may be provided while being incorporated in the ROM 72 in advance.

The computer programs for executing each of the above-mentioned pieces of processing executed by the learning device 10 in the above-mentioned embodiment may be stored in a computer-readable storage medium such as a CD-ROM, a CD-R, a memory card, a digital versatile disc (DVD), and a flexible disk (FD) in a file in an installable format or an executable format, and provided as a computer program product. The computer programs for executing the above-mentioned processing executed by the learning device 10 in the above-mentioned embodiment may be stored on a computer connected to a network such as the Internet, and provided by being downloaded through the network. The computer programs for executing the above-mentioned processing executed by the learning device 10 in the above-mentioned embodiment may be provided or distributed through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A machine learning device, comprising:
one or more processors configured to:
calculate, from target data including first target data that is data to be classified and including second target data that is data to be classified and that is other than the first target data, a latent vector of each of a plurality of the first target data by using parameters that include a weighting and a bias and that are for a machine learning model configured to output a latent vector indicating a feature of input target data on a latent space so as to calculate a plurality of latent vectors corresponding to the plurality of first target data;
calculate, for each first target data of the plurality of first target data, first probabilities that the first target data belongs to virtual classes, on an assumption that the plurality of first target data belong to the virtual classes different from each other;

calculate a first loss based on the calculated first probabilities for each of the plurality of first target data;

calculate a second loss that is lower as, for each of element classes to which a plurality of elements included in each of the plurality of first target data belong, a relation with another element class is lower; and update the parameters such that a loss function expressed by L=L_1+aL_2 becomes lower, wherein L represents the loss function, L_1 represents the first loss, L_2 represents the second loss, and a represents a weighting of the second loss, wherein the one or more processors are further configured to calculate the second loss by using:

$$L\_2 = -\sum_{i=1}^{n}\log\frac{\exp(f_i f_i^T/\tau')}{\sum_{k=1}^{n}\exp(f_k f_i^T/\tau')} \quad (1)$$

where L_2 represents the second loss, $f_i$ represents a vector having the values extracted from each of the plurality of latent vectors for an i-th case included in the plurality of first target data, n is a number of dimensions of the latent vector, τ' is a variable for controlling a magnitude of a difference in the second loss, T represents a transposed matrix, $f_k$ represents a vector for the each element extracted from the plurality of latent vectors for a k-th case included in the plurality of first target data, and k represents the k-th case.

2. The device according to claim 1, wherein the one or more processors are further configured to use the first probabilities to calculate the first loss that is lower as each first target data of the plurality of first target data is easier to be classified into a virtual class to which the first target data belongs.

3. The device according to claim 1, wherein the one or more processors are further configured to classify the plurality of first target data into a plurality of clusters based on the latent vectors of the plurality of first target data calculated by using the learning model having the parameter that has been updated.

4. The device according to claim 3, wherein the one or more processors are further configured to classify the plurality of first target data into the plurality of clusters by using at least one of a distance and a degree of similarity between the plurality of latent vectors of the plurality of first target data.

5. The device according to claim 3, wherein the one or more processors are further configured to search for a first target data different from and similar to a particular first target data among the plurality of first target data based on the plurality of latent vectors of the plurality of first target data calculated by using the learning model, the parameters of which have been updated.

6. The device according to claim 3, wherein the one or more processors are further configured to classify, into any of the plurality of clusters, the second target data, based on:

a classification statistical value of each of the clusters of the plurality of latent vectors of the plurality of first target data calculated by using the learning model, the parameters of which have been updated; and a particular latent vector of the second target data calculated by using the learning model.

7. The device according to claim 3, wherein the one or more processors are further configured to classify, into any of the plurality of clusters, the second target data, based on:

the plurality of latent vectors of the plurality of first target data calculated by using the learning model, the parameters of which have been updated; and a particular latent vector of the second target data calculated by using the learning model.

8. The device according to claim 3, wherein based on latent vectors of a plurality of second target data calculated by using the learning model, the parameters of which have been updated, the one or more processors are further configured to search for a second target data different from and similar to a particular second target data among the plurality of second target data, the plurality of second target data being target data other than the first target data.

9. The device according to claim 1, wherein the one or more processors are further configured to calculate the first probabilities for the plurality of first target data by using a function including a variable for causing a difference between a first probability that one first target data of the plurality of first target data belongs to a virtual class thereof and a first probability that the first target data belongs to another virtual class other than the virtual class, to be in a predetermined range.

10. A machine learning method to be executed by a computer, the method comprising:

calculating, from target data including first target data that is data to be classified and including second target data that is data to be classified and that is other than the first target data, a latent vector of each of a plurality of first target data by using parameters that include a weighting and a bias and that are for a machine learning model configured to output a latent vector indicating a feature of input target data on a latent space so as to calculate a plurality of latent vectors corresponding to the plurality of first target data;

calculating, for each first target data of the plurality of first target data, first probabilities that the first target data belongs to virtual classes on an assumption that the plurality of first target data belong to the virtual classes different from each other;

calculating a first loss based on the calculated first probabilities for each of the plurality of first target data;

calculating a second loss that is lower as, for each of element classes to which a plurality of elements included in each of the plurality of first target data belong, a relation with another element class is lower; and updating the parameters such that a loss function expressed by L=L_1+aL_2 becomes lower, wherein L represents the loss function, L_1 represents the first loss, L_2 represents the second loss, and a represents a weighting of the second loss, wherein the step of calculating the second loss further comprises calculating the second loss by using:

$$L\_2 = -\sum_{i=1}^{n}\log\frac{\exp(f_i f_i^T/\tau')}{\sum_{k=1}^{n}\exp(f_k f_i^T/\tau')} \quad (1)$$

where L_2 represents the second loss, $f_i$ represents a vector having the values extracted from each of the plurality of latent vectors for an i-th case included in the plurality of first target data, n is a number of dimensions of the latent vector, τ' is a variable for controlling a magnitude of a difference in the second loss, T represents a transposed matrix, $f_k$ represents a vector for the each element extracted from the plurality of latent vectors for a k-th case included in the plurality of first target data, and k represents the k-th case.

11. A computer program product comprising a non-transitory computer-readable storage medium including programmed instructions stored therein, the instructions causing a computer to execute:
  calculating, from target data including first target data that is data to be classified and including second target data that is data to be classified and that is other than the first target data, a latent vector of each of a plurality of first target data by using parameters that include a weighting and a bias and that are for a machine learning model configured to output a latent vector indicating a feature of input target data on a latent space so as to calculate a plurality of latent, vectors corresponding to the plurality of first target data;
  calculating, for each first target data of the plurality of first target data, first probabilities that the first target data belongs to virtual classes on an assumption that the plurality of first target data belong to the virtual classes different from each other;
  calculating a first loss based on the calculated first probabilities for each of the plurality of first target data;
  calculating a second loss that is lower as, for each of element classes to which a plurality of elements included in each of the plurality of first target data belong, a relation with another element class is lower; and
  updating the parameters such that a loss function expressed by L=L_1+aL_2 becomes lower, wherein L represents the loss function, L_1 represents the first loss, L_2 represents the second loss, and a represents a weighting of the second loss,
  wherein the step of calculating the second loss further comprises calculating the second loss by using:

$$\mathrm{L}\_2 = -\sum_{i=1}^{n} \log \frac{\exp(f_i f_i^T / \tau')}{\sum_{k=1}^{n} \exp(f_k f_i^T / \tau')} \quad (1)$$

where L_2 represents the second loss, $f_i$ represents a vector having the values extracted from each of the plurality of latent vectors for an i-th case included in the plurality of first target data, n is a number of dimensions of the latent vector, $\tau'$ is a variable for controlling a magnitude of a difference in the second loss, T represents a transposed matrix, $f_k$ represents a vector for the each element extracted from the plurality of latent vectors for a k-th case included in the plurality of first target data, and k represents the k-th case.

* * * * *